(12) United States Patent
Cho et al.

(10) Patent No.: US 11,402,875 B2
(45) Date of Patent: Aug. 2, 2022

(54) ELECTRONIC DEVICE INCLUDING DISPLAY

(71) Applicant: Samsung Electronics Co., Ltd., Suwon-si (KR)

(72) Inventors: Chongkun Cho, Suwon-si (KR); Jaehee Kim, Suwon-si (KR); Daehyeong Park, Suwon-si (KR); Uyhyeon Jeong, Suwon-si (KR); Sunggun Cho, Suwon-si (KR); Wonhee Choi, Suwon-si (KR); Jongmin Choi, Suwon-si (KR); Seunghyun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 16/850,446

(22) Filed: Apr. 16, 2020

(65) Prior Publication Data

US 2020/0333849 A1 Oct. 22, 2020

(30) Foreign Application Priority Data

Apr. 22, 2019 (KR) .......................... 10-2019-0046736

(51) Int. Cl.
*G06F 1/16* (2006.01)
*G06F 1/18* (2006.01)

(52) U.S. Cl.
CPC .......... *G06F 1/1656* (2013.01); *G06F 1/1609* (2013.01); *G06F 1/1626* (2013.01); *G06F 1/182* (2013.01)

(58) Field of Classification Search
CPC .... G06F 1/1656; G06F 1/1626; G06F 1/1609; G06F 1/182; G06F 1/1637
See application file for complete search history.

(56) References Cited

U.S. PATENT DOCUMENTS 8,853,941 B2 * 10/2014 Jung ..................... G06F 1/1601
313/512
9,454,179 B2 * 9/2016 Shin .................. H04M 1/72469
(Continued)

FOREIGN PATENT DOCUMENTS

| CN | 105120024 A | 12/2015 |
| JP | 08152374 A | 6/1996 |
| KR | 10-1635197 B1 | 6/2016 |

OTHER PUBLICATIONS

International Search Report and Written Opinion dated Aug. 6, 2020, issued in International Application No. PCT/KR2020/005087.

*Primary Examiner* — Anthony M Haughton
*Assistant Examiner* — Theron S Milliser
(74) *Attorney, Agent, or Firm* — Jefferson IP Law, LLP

(57) ABSTRACT

An electronic device including a display is provided. The electronic device includes a housing, a display, and a bonding layer. The housing includes a front plate including a flat portion and at least one curved portion bent from a periphery of the flat portion, and disposed to face a first direction, a rear plate disposed to face a second direction that is opposite to the first direction, and a side member including a first surface disposed to face a direction that is perpendicular to the first and second directions, and extending while facing the curved portion and surrounding at least a partial space between the front plate and the rear plate. A first groove is recessed on the first surface in the second direction and in which an edge of the curved portion is accommodated, and a second groove is recessed on the inner side of the housing when viewed from the top of the front plate, the second groove is recessed in the second direction, and to which a bonding liquid is applied.

20 Claims, 16 Drawing Sheets

(56) References Cited

U.S. PATENT DOCUMENTS

| | | | | |
|---|---|---|---|---|
| 9,699,279 | B2* | 7/2017 | Lee | H04M 1/0202 |
| 9,872,408 | B2* | 1/2018 | Choi | H04M 1/18 |
| 9,912,789 | B2* | 3/2018 | Shimoda | G06F 1/1626 |
| 9,948,343 | B2* | 4/2018 | Moon | H04M 1/0266 |
| 9,989,995 | B2* | 6/2018 | Kwak | G06F 1/1637 |
| 9,992,893 | B2* | 6/2018 | Choi | G06F 1/1637 |
| 10,312,956 | B2* | 6/2019 | Cha | H04B 1/38 |
| 10,389,007 | B1* | 8/2019 | Choi | H01Q 1/2283 |
| 10,405,446 | B2* | 9/2019 | Choi | H05K 5/03 |
| 10,412,846 | B1* | 9/2019 | Phan Thanh | G06F 1/1652 |
| 10,534,405 | B2* | 1/2020 | Kim | G06F 1/1698 |
| 10,686,479 | B2* | 6/2020 | Cha | H04M 1/18 |
| 10,691,171 | B2* | 6/2020 | Kang | H04M 1/0266 |
| 10,736,226 | B2* | 8/2020 | Han | H05K 5/0017 |
| 10,778,819 | B2* | 9/2020 | Kim | G06F 1/1656 |
| 10,877,519 | B2* | 12/2020 | Lin | G06F 1/1656 |
| 2013/0242481 | A1* | 9/2013 | Kim | H04B 1/3888 |
| | | | | 361/679.01 |
| 2014/0139984 | A1* | 5/2014 | Jung | G06F 1/1656 |
| | | | | 361/679.01 |
| 2015/0331451 | A1* | 11/2015 | Shin | H04M 1/0283 |
| | | | | 345/173 |
| 2016/0337489 | A1* | 11/2016 | Shimoda | H04M 1/0266 |
| 2017/0063421 | A1* | 3/2017 | Moon | G06F 1/1626 |
| 2017/0099742 | A1* | 4/2017 | Choi | H05K 5/03 |
| 2018/0098446 | A1* | 4/2018 | Choi | H05K 5/0217 |
| 2018/0101196 | A1 | 4/2018 | Franklin et al. | |
| 2018/0196476 | A1* | 7/2018 | Kang | G06F 1/1647 |
| 2018/0247582 | A1* | 8/2018 | Park | G06F 1/1637 |
| 2018/0249584 | A1* | 8/2018 | Kim | H04M 1/0268 |
| 2018/0249588 | A1* | 8/2018 | Choi | G06F 1/1656 |
| 2018/0278284 | A1* | 9/2018 | Cha | H04M 1/18 |
| 2018/0299929 | A1* | 10/2018 | Kim | G06F 1/1635 |
| 2018/0343332 | A1* | 11/2018 | Kim | H04M 1/0249 |
| 2019/0012544 | A1* | 1/2019 | Park | G06K 9/209 |
| 2019/0253093 | A1* | 8/2019 | Cha | H05K 5/0095 |
| 2019/0258294 | A1* | 8/2019 | Lin | H01M 50/209 |
| 2019/0343013 | A1* | 11/2019 | Choi | G06F 1/1656 |
| 2020/0367379 | A1* | 11/2020 | Han | G06F 1/1637 |
| 2020/0412851 | A1* | 12/2020 | Kim | H04M 1/026 |

* cited by examiner

ELECTRONIC DEVICE INCLUDING DISPLAY

CROSS-REFERENCE TO RELATED APPLICATION(S)

This application is based on and claims priority under 35 U.S.C. § 119 of a Korean patent application number 10-2019-0046736, filed on Apr. 22, 2019, in the Korean Intellectual Property Office, the disclosure of which is incorporated by reference herein in its entirety.

BACKGROUND

1. Field

The disclosure relates to an electronic device. More particularly, the disclosure relates to an electronic device including a display.

2. Description of Related Art

An electronic device may provide a waterproof structure by joining a window to a housing on a front surface thereof. The waterproof structure may realize a waterproof structure by attaching a tape between the window and the housing.

The window joining process may include an operation of attaching a tape to a flat portion of a housing, on which a window is seated, and an operation of seating the window, to which a display panel is coupled, in the housing.

The above information is presented as background information only to assist with an understanding of the disclosure. No determination has been made, and no assertion is made, as to whether any of the above might be applicable as prior art with regard to the disclosure.

SUMMARY

However, it may be more difficult to realize a waterproof structure by using a tape when the window is in a curved state, that is, in a 3D shape, than to realize a waterproof structure by using a tape in a flat state, that is, in a 2D window.

Aspects of the disclosure are to address at least the above-mentioned problems and/or disadvantages and to provide at least the advantages described below. Accordingly, an aspect of the disclosure is to provide an apparatus and method for an electronic device having a joining structure of a 3D front plate (e.g., a window and a display) and a housing.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front plate including a flat portion and at least one curved portion bent from a periphery of the flat portion, and disposed to face a first direction, a rear plate disposed to face a second direction that is opposite to the first direction, and a side member including a first surface disposed to face a direction that is perpendicular to the first and second directions, and extending while facing the curved portion and surrounding at least a partial space between the front plate and the rear plate, a display disposed to be viewed through at least a portion of the front plate, a first groove recessed on the first surface in the second direction and in which an end of the curved portion is accommodated, and a bonding layer disposed between the front plate and at least a portion of the first groove.

In accordance with another aspect of the disclosure, an electronic device is provided. The electronic device includes a housing including a front plate including a flat portion and at least one curved portion bent from a periphery of the flat portion, and disposed to face a first direction, a rear plate disposed to face a second direction that is opposite to the first direction, and a side member including a first surface disposed to face a direction that is perpendicular to the first and second directions, and extending while facing the curved portion and surrounding at least a partial space between the front plate and the rear plate, a first groove recessed on the first surface in the second direction and in which an edge of the curved portion is accommodated, and a second groove recessed on the inner side of the housing when viewed from the top of the front plate, the second groove recessed in the second direction, and to which a bonding liquid is applied.

According to various embodiments of the disclosure, automation of a process may be facilitated without a process of attaching a tape and removing a delamination sheet during a process of joining a front plate and a side member.

According to various embodiments of the disclosure, the number of subsidiary members is reduced during a front plate joining process, manufacturing costs can be reduced.

According to various embodiments of the disclosure, because a second groove is disposed in the side member, a bonding liquid can be prevented from flowing down or overflowing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the disclosure may include, for example, and without limitation, at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (for example, smart glasses, head-mounted-devices (HMDs), electronic apparels, electronic bracelets, electronic necklaces, electronic appcessory, electronic tattoos, smart mirrors, smart watches, or the like), or the like.

Figure 1:
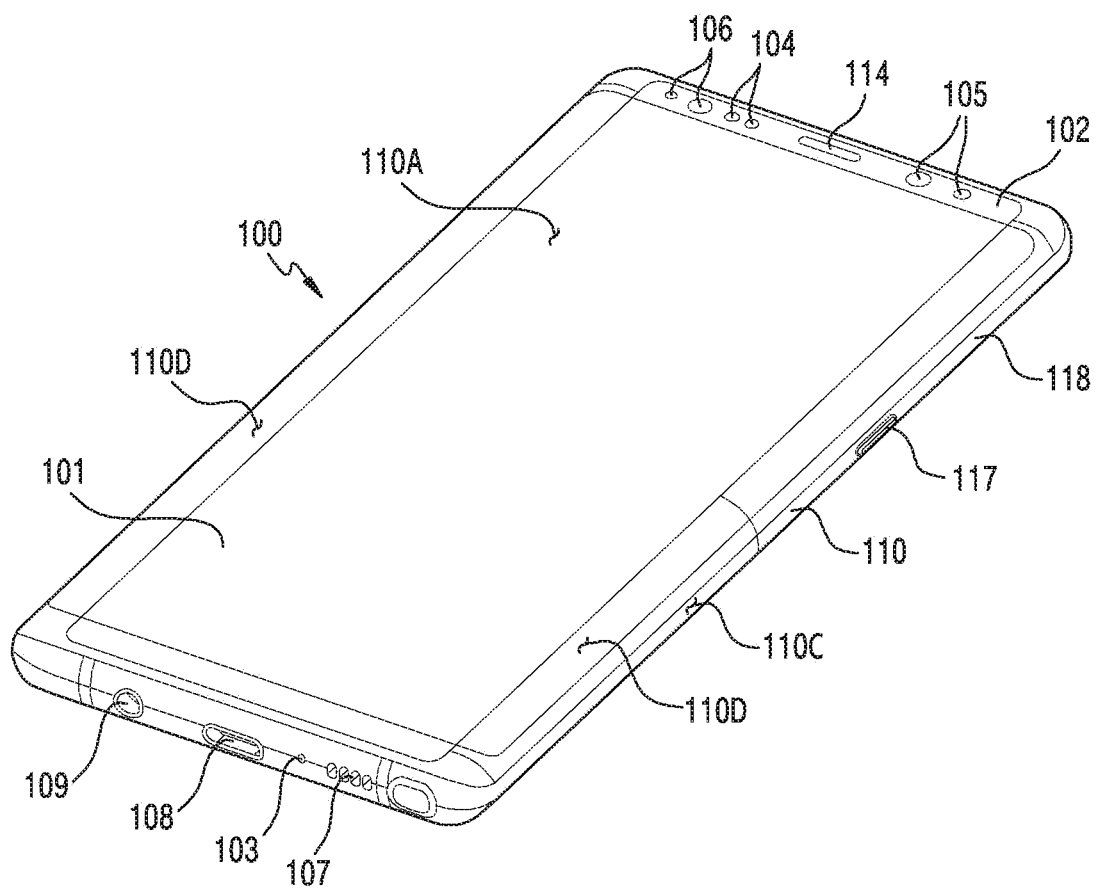
FIG. 1 is a perspective view illustrating the front face of an example mobile electronic device according to an embodiment of the disclosure.
Figure 2:
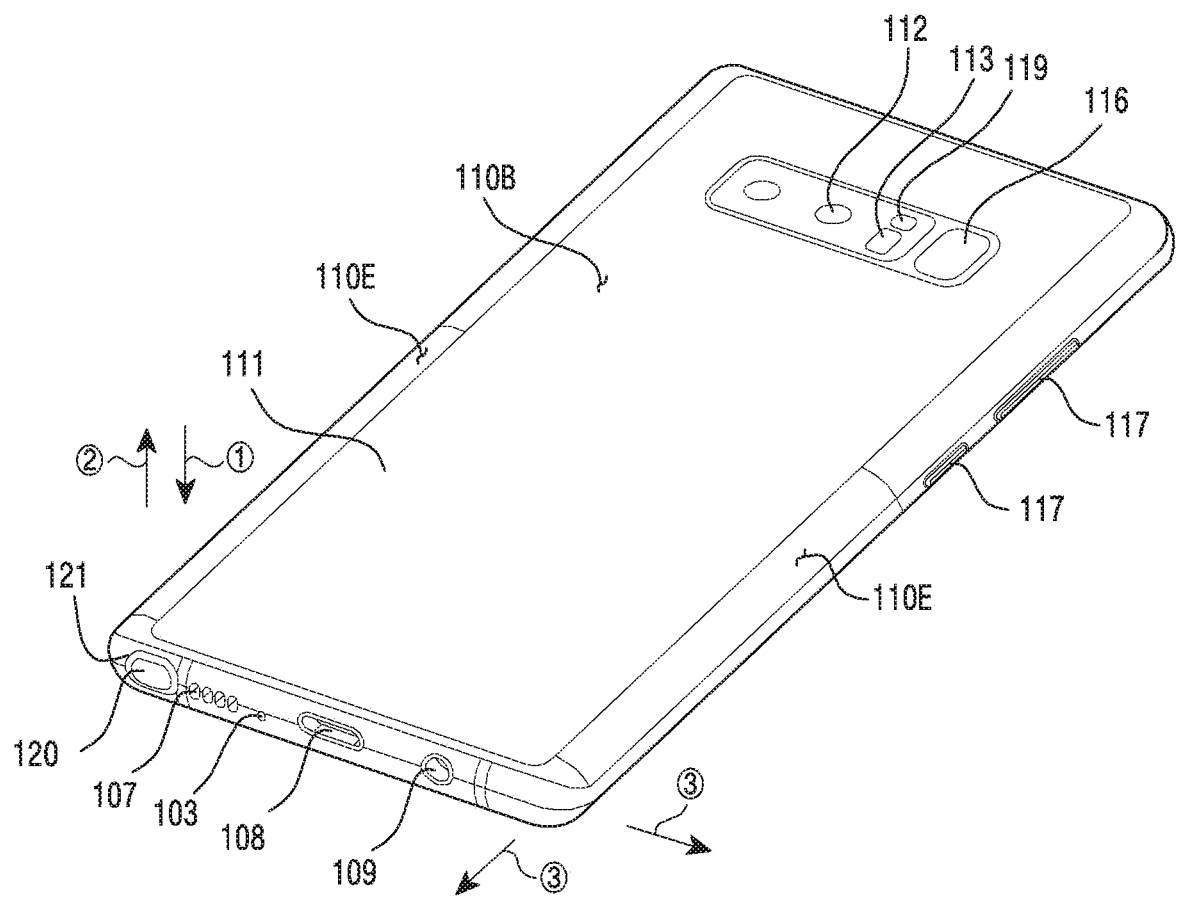
FIG. 2 is a perspective view illustrating the rear face of the electronic device of FIG. 1 according to an embodiment of the disclosure.

FIG. 1 is a perspective view illustrating the front face of an example mobile electronic device according to an embodiment of the disclosure. FIG. 2 is a perspective view illustrating the rear face of the example electronic device of FIG. 1 according to an embodiment of the disclosure.

Referring to FIGS. 1 and 2, an electronic device 100 according to an embodiment may include a housing 110 including a first surface (or a front surface) 110A disposed to face a first direction (①), a second surface (or a rear surface) 110B disposed to face a second direction (②) that is opposite to the first direction (①), and a side surface disposed to face a third direction (③) facing a direction that is perpendicular to the first and second directions (① and ②) and surrounding a space between the first surface 110A and the second surface 110B.

Referring to FIGS. 1 and 2, an electronic device 100 according to an embodiment may include: a housing 110 including a first face (or a front face) 110A, a second face (or a rear face) 110B, and a side face 110C surrounding a space between the first face 110A and the second face 110B. In another embodiment (not illustrated), the term, housing, may refer, for example, to a structure forming some of the first face 110A, the second face 110B, and the side face 110C of FIG. 1. According to an embodiment, at least a portion of the first face 110A may be formed by a substantially transparent front plate 102 (e.g., a glass plate or a polymer plate including various coating layers). The second face 110B may be formed by a substantially opaque rear plate 111. The rear plate 111 may be formed of, for example, coated or colored glass, ceramic, polymer, metal (e.g., aluminum, stainless steel (STS), or magnesium), or any combination thereof. The side face 110C may be formed by a side bezel structure (or a "side member") 118 coupled to the front plate 102 and the rear plate 111 and including a metal and/or a polymer. In some embodiments, the rear plate 111 and the side bezel structure 118 may be integrally formed, and may include the same material (e.g., a metal material such as aluminum).

In the illustrated embodiment, the front plate 102 may include two first regions 110D, which are bent from the first face 110A toward the rear plate 111 and extend seamlessly, at the long opposite side edges thereof. In the illustrated embodiment (see FIG. 2), the rear plate 111 may include two second regions 110E, which are bent from the second face 110B toward the front plate 102 and extend seamlessly, at the long opposite side edges thereof. In some embodiments, the front plate 102 (or the rear plate 111) may include only one of the first regions 110D (or the second regions 110E). In another embodiment, some of the first regions 110D and the second regions 110E may not be included. In the above embodiments, when viewed from a side of the electronic device 100, the side bezel structure 118 may have a first thickness (or width) on a side face where the first regions 110D or the second regions 110E are not included, and may have a second thickness (or width), which is thinner than the first thickness, on a side where the first regions 110D or the second regions 110E are included.

According to an embodiment, the electronic device 100 may include one or more of a display 101, audio modules 103, 107, and 114, sensor modules 104, 116, and 119, camera modules 105 and 112, key input devices 117, a light-emitting element 106, a pen input device 120, and connector holes 108, 109. In some embodiments, in the electronic device 100, at least one of the components ((e.g., the key input devices 117 or the light-emitting element 116) may be omitted, or other components may be additionally included.

The display 101 may be exposed through a substantial portion of the front plate 102, for example. In some embodiments, at least a portion of the display 101 may be exposed through the front plate 102 forming the first face 110A and the first regions 110D of the side faces 110C. In some embodiments, the edges of the display 101 may be formed to be substantially the same as the adjacent contours of the front plate 102. In another embodiment (not illustrated), the distance between the outer contour of the display 101 and the outer contour of the front plate 102 may be substantially constant in order to enlarge the exposed area of the display 101.

In another embodiment (not illustrated), a recess or an opening is disposed in a portion of a screen display region of the display 101, and at least one of an audio module 114, a sensor module 104, a camera module 105, and a light-emitting element 106 may be aligned with the recess or the opening. In another embodiment (not illustrated), a rear face of the screen display region of the display 101 may include at least one of an audio module 114, a sensor module 104, a camera module 105, a fingerprint sensor 116, and a light-emitting element 106. In another embodiment (not illustrated), the display 101 may be coupled to or disposed adjacent to a touch-sensing circuit, a pressure sensor capable of measuring the intensity of the touch (pressure), and/or a digitizer that detects a stylus pen. In some embodiments, at least some of the sensor modules 104 and 119 and/or at least some of the key input devices 117 may be disposed in the first regions 110D and/or the second regions 110E.

The audio modules 103, 107, and 114 may include a microphone hole 103 and speaker holes 107 and 114. The microphone hole 103 may include a microphone disposed therein to acquire external sound, and in some embodiments, a plurality of microphones disposed therein to sense the direction of sound. The speaker holes 107 and 114 may include an external speaker hole 107 and a phone call receiver hole 114. In some embodiments, the speaker holes 107 and 114 and the microphone hole 103 may be implemented as a single hole, or a speaker may be included without the speaker holes 107 and 114 (e.g., a piezo speaker).

The sensor modules 104, 116, and 119 may generate electrical signals and/or data values corresponding to an operating state inside the electronic device 100, or an external environmental condition. The sensor modules 104, 116, and 119 may include, for example, a first sensor module 104 (e.g., a proximity sensor) and/or a second sensor module (not illustrated) (e.g., a fingerprint sensor) disposed on the first face 110A of the housing 110, and/or a third sensor module 119 (e.g., an HRM sensor) and/or a fourth sensor module 116 (e.g., a fingerprint sensor) disposed on the second face 110B of the housing 110. The fingerprint sensor may be disposed not only on the first face 110A of the housing 110 (e.g., the display 101), but also on the second face 110B. The electronic device 100 may further include at least one of sensors (not illustrated) such as a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, and an illuminance sensor 104.

The camera modules 105 and 112 may include a first camera device 105 disposed on the first face 110A of the electronic device 100 and a second camera device 112 disposed on the second surface 110B, and/or a flash 113. The camera devices 105 and 112 may include one or more lenses, an image sensor, and/or an image signal processor. The flash 113 may include, for example, a light-emitting diode or a xenon lamp. In some embodiments, two or more lenses (e.g., an infrared camera lens, a wide-angle lens, and a telephoto lens) and image sensors may be disposed on one face of the electronic device 100.

The key input devices 117 may be disposed on the side surfaces 110C of the housing 110. In another embodiment, the electronic device 100 may not include some or all of the above-mentioned key input devices 117, and a non-included key input device 117 may be implemented in another form such as a soft key on the display 101. In some embodiments, the key input devices may include a sensor module 116 disposed on the second face 110B of the housing 110.

The light-emitting element 106 may be disposed on the first face 110A of the housing 110, for example. The light-emitting element 106 may provide, for example, status information of the electronic device 100 in an optical form. In another embodiment, the light-emitting element 106 may provide a light source that is interlocked with, for example, the operation of the camera module 105. The light-emitting element 106 may include, for example, and without limitation, an LED, an IR LED, a xenon lamp, or the like.

The connector holes 108 and 109 may include a first connector hole 108 capable of accommodating a connector (e.g., a USB connector) for transmitting and receiving power and/or data to and from an external electronic device, and/or a second connector hole 109 capable of receiving a connector (e.g., an earphone jack) for transmitting and receiving an audio signal to and from an external electronic device.

The pen input device 120 (e.g., a stylus pen) may be guided to be inserted into or detached from the inside of the housing 110 through a hole 121 formed in a side face of the housing 110, and may include a button for facilitating the detachment. The pen input device 120 may include a separate resonance circuit therein so as to be interlocked with an electromagnetic induction panel 390 (e.g., a digitizer) included in the electronic device 100. The pen input device 120 may include an ElectroMagnetic Resonance (EMR) scheme, an Active Electrical Stylus (AES) scheme, and an Electric-Coupled Resonance (ECR) scheme.

Figure 3:
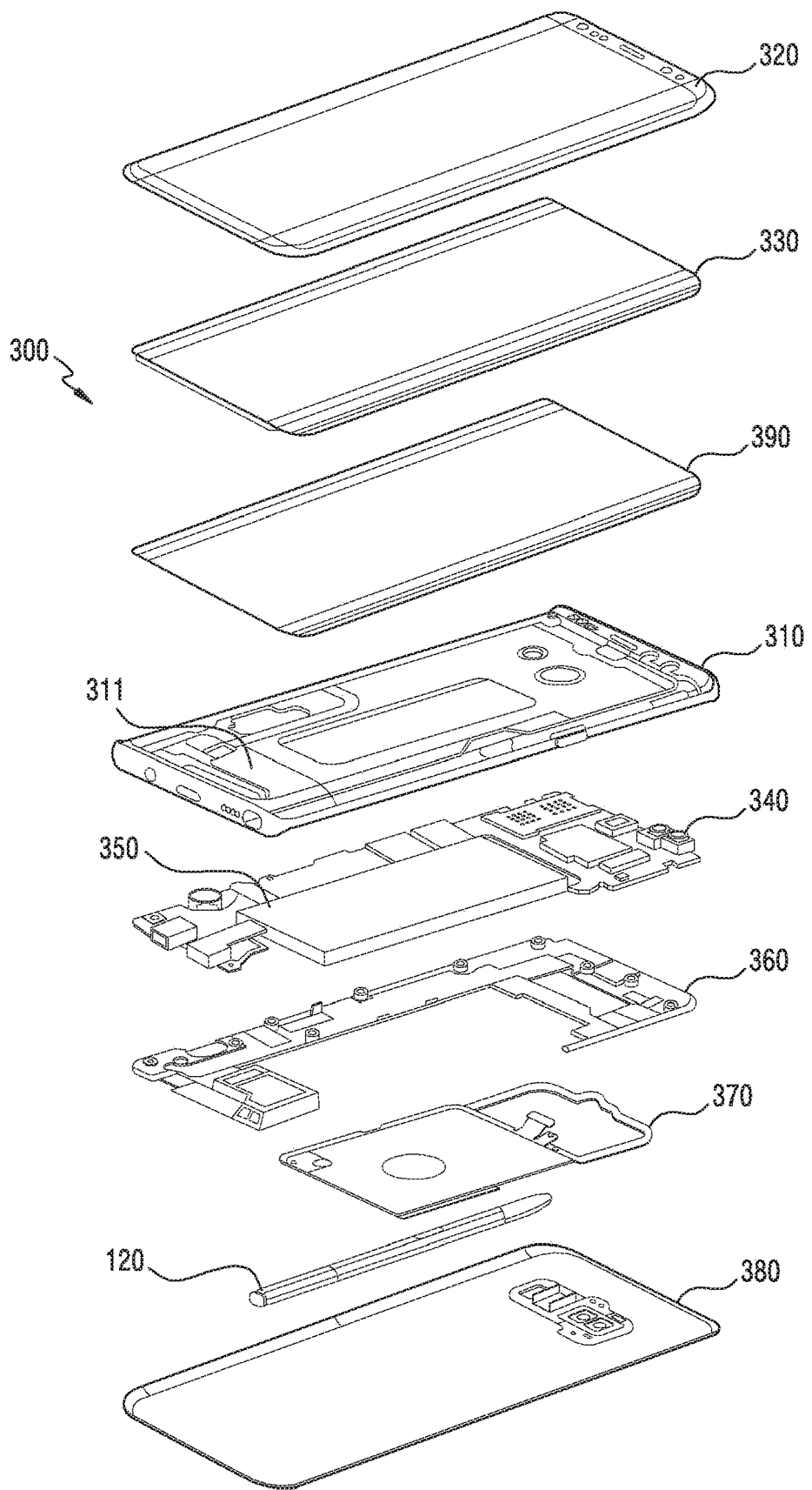
FIG. 3 is an exploded perspective view illustrating an example internal configuration of the electronic device of FIG. 1 according to an embodiment of the disclosure.

FIG. 3 is an exploded perspective view illustrating an example internal configuration of the electronic device of FIG. 1 according to an embodiment of the disclosure.

Referring to FIG. 3, the electronic device 300 may include a side bezel structure 310, a first support member 311 (e.g., a bracket), a front plate 320, a display 330, an electromagnetic induction panel 390, a printed circuit board 340, a battery 350, a second support member 360 (e.g., a rear case), an antenna 370, a pen input device 120, and a rear plate 380. In some embodiments, in the electronic device 300, at least one of the components (e.g., the first support member 311 or the second support member 360) may be omitted, or other components may be additionally included. At least one of the components of the electronic device 300 may be the same as or similar to at least one of the components of the electronic device 100 of FIG. 1 or 2, and a redundant description is omitted below.

The electromagnetic induction panel 390 (e.g., a digitizer) may be a panel configured to sense the input of the pen input device 120. For example, the electromagnetic induction panel 390 may include a printed circuit board (e.g., a Flexible Printed Circuit Board (FPCB)) and a shielding sheet. The shielding sheet is capable of preventing and/or reducing interference between the components due to electromagnetic fields generated from the components (e.g., the display module, the printed circuit board, the electromagnetic induction panel, etc.) included in the electronic device 100. By shielding the electromagnetic field generated from the components, the shielding sheet is capable of causing the input from the pen input device 120 to be accurately transferred to the coil included in the electromagnetic induction panel 390. The electromagnetic induction panel 390 according to various embodiments may include an opening formed in at least a region corresponding to the biometric sensor mounted on the electronic device 100.

The first support member 311 may be disposed inside the electronic device 300 and connected to the side bezel structure 310 or may be formed integrally with the side bezel structure 310. The first support member 311 may be formed of, for example, a metal material and/or a non-metal (e.g., polymer) material. A display 330 may be coupled to one side of the first support member 311, and a printed circuit board 340 may be coupled to the other side of the first support member 311. On the printed circuit board 340, a processor, a memory, and/or an interface, or the like, may be mounted, but the disclosure is not limited thereto. The processor may include, for example, and without limitation, one or more of a central processing unit, an application processor, a graphic processor, an image signal processor, a sensor hub processor, a communication processor, or the like.

The memory may include, for example, and without limitation, a volatile memory, a non-volatile memory, or the like.

The interface may include, for example, and without limitation, an HDMI, a USB interface, an SD card interface, and/or an audio interface, or the like. The interface may electrically or physically connect, for example, the electronic device 300 to an external electronic device, and may include a USB connector, an SD card/an MMC connector, or an audio connector.

The battery 350 may refer, for example, to a device for supplying power to at least one component of the electronic device 300 and may include, for example, and without limitation, a non-rechargeable primary battery, a rechargeable secondary battery, a fuel cell, or the like. At least a portion of the battery 350 may be disposed to be substantially flush with, for example, the printed circuit board 340. The battery 350 may be integrally disposed within the electronic device 300, or may be mounted to be detachable from the electronic device 300.

The antenna 370 may be disposed between the rear plate 380 and the display 350. The antenna 370 may include, for example, a Near Field Communication (NFC) antenna, a wireless charging antenna, and/or a Magnetic Secure Transmission (MST) antenna. The antenna 370 is capable of, for example, performing short-range communication with an external device or transmitting and receiving power required for charging in a wireless manner. In other embodiments, an antenna structure may be formed by the side bezel structure 310, a portion of the first support member 311, or a combination thereof.

Figure 4:
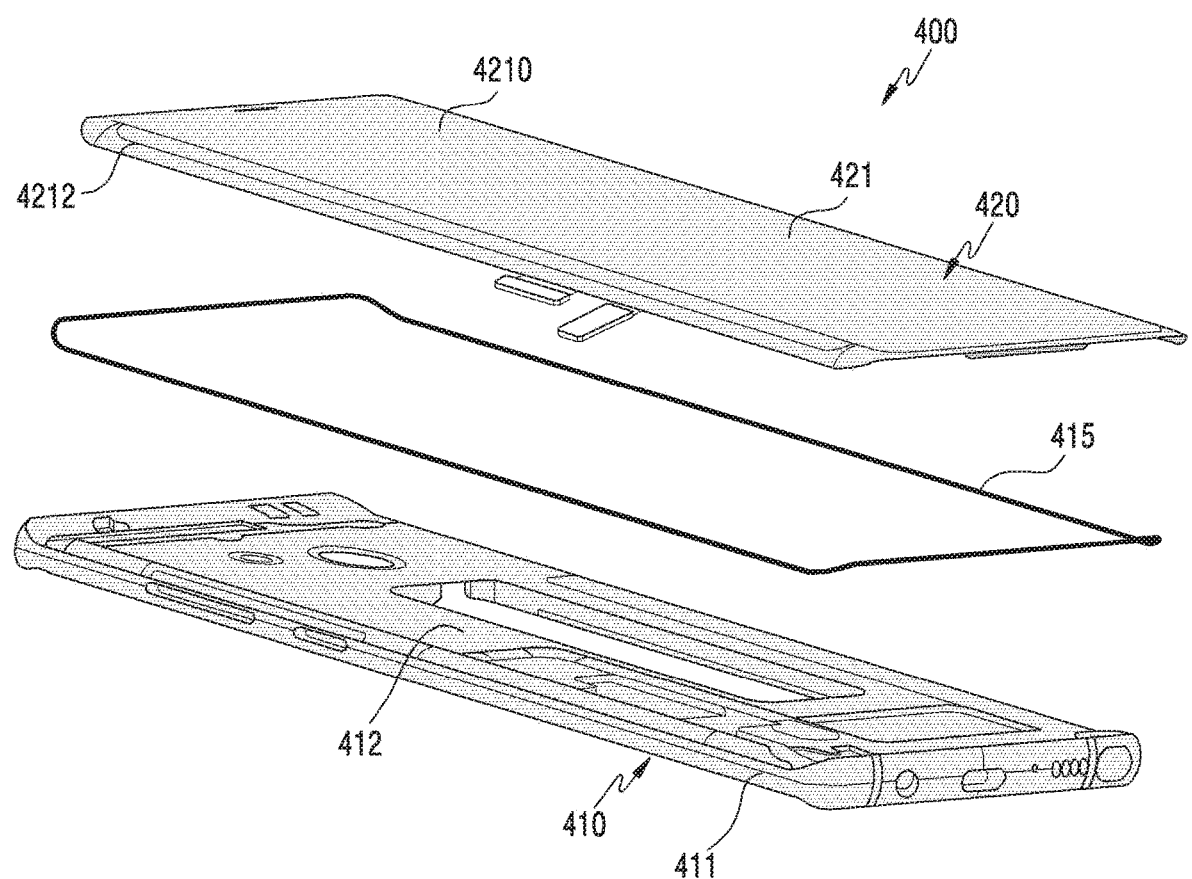
FIG. 4 is an exploded perspective view illustrating a joining structure of a front plate and a housing according to an embodiment of the disclosure.

FIG. 4 is an exploded perspective view illustrating a joining structure of a front plate and a housing according to an embodiment of the disclosure.

Referring to FIG. 4, an electronic device 400 (e.g., the electronic device 100 illustrated in FIG. 1 or the electronic device 300 illustrated in FIG. 3) according to an embodiment may include a hosing 410 (e.g., the housing 110 illustrated in FIG. 1) including a side member 411, a display module 420 including a front plate 421, and a bonding layer 415. According to an embodiment, the housing may include a support member 412 for supporting the display module 420 attached, and a side member 411 coupled to at least a portion of the support member 412. According to an embodiment, the front plate 421 and the side member 411 may be coupled to each other by the bonding layer 415. For example, the bonding layer 415 is a bonding member, and may be a waterproof member.

According to an embodiment, the front plate 421 may include a flat portion 4210 and a curved portion 4212. According to an embodiment, the curved portion 4212 may be formed to have a shape that is bent from at least one of edges of the flat portion 4210. For example, the curved portion 4212 may extend in a shape that is bent from one edge, two edges, three edges, or four edges. According to an embodiment, the curved portion 4212 may be formed to have a shape that is curved to have a curvature.

According to an embodiment, the bonding layer 415 may perform a waterproof function by sealing a space between the front plate 421 and the side member 411. According to an embodiment, the bonding layer 415 may include a seating part formed along an edge of the side member 411, and a bonding liquid applied between the seating part and the front plate 421 disposed on the seating part. According to an embodiment, the applied bonding liquid may be located between the front plate 421 and the side member 411. Further, the applied bonding liquid may be located between the display module 420 and the side member 411.

According to an embodiment, the bonding layer 415, when viewed from the top of the front plate 421, may continuously extend along an edge of the front plate 421 or an edge of the side member 411 and be disposed in a substantially closed curve shape.

Figure 5:
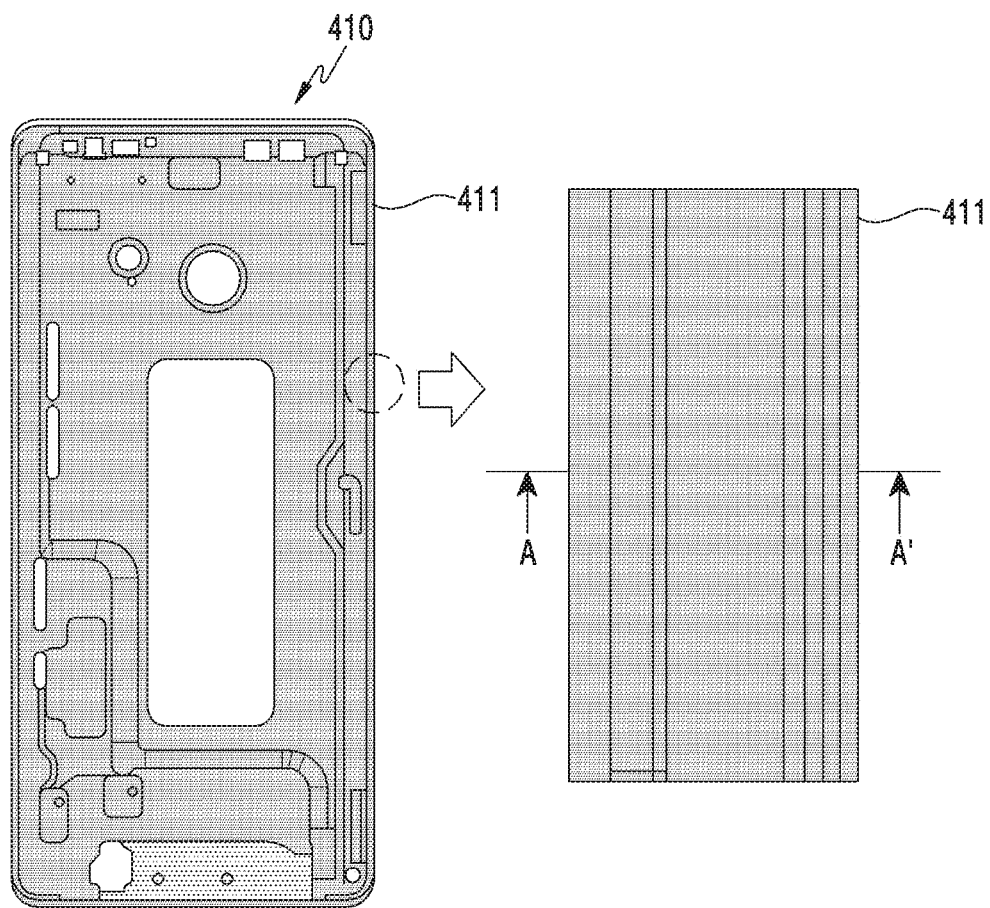
FIG. 5 is an enlarged plan view illustrating a portion of a seating part of a housing of an electronic device according to an embodiment of the disclosure.
Figure 6:
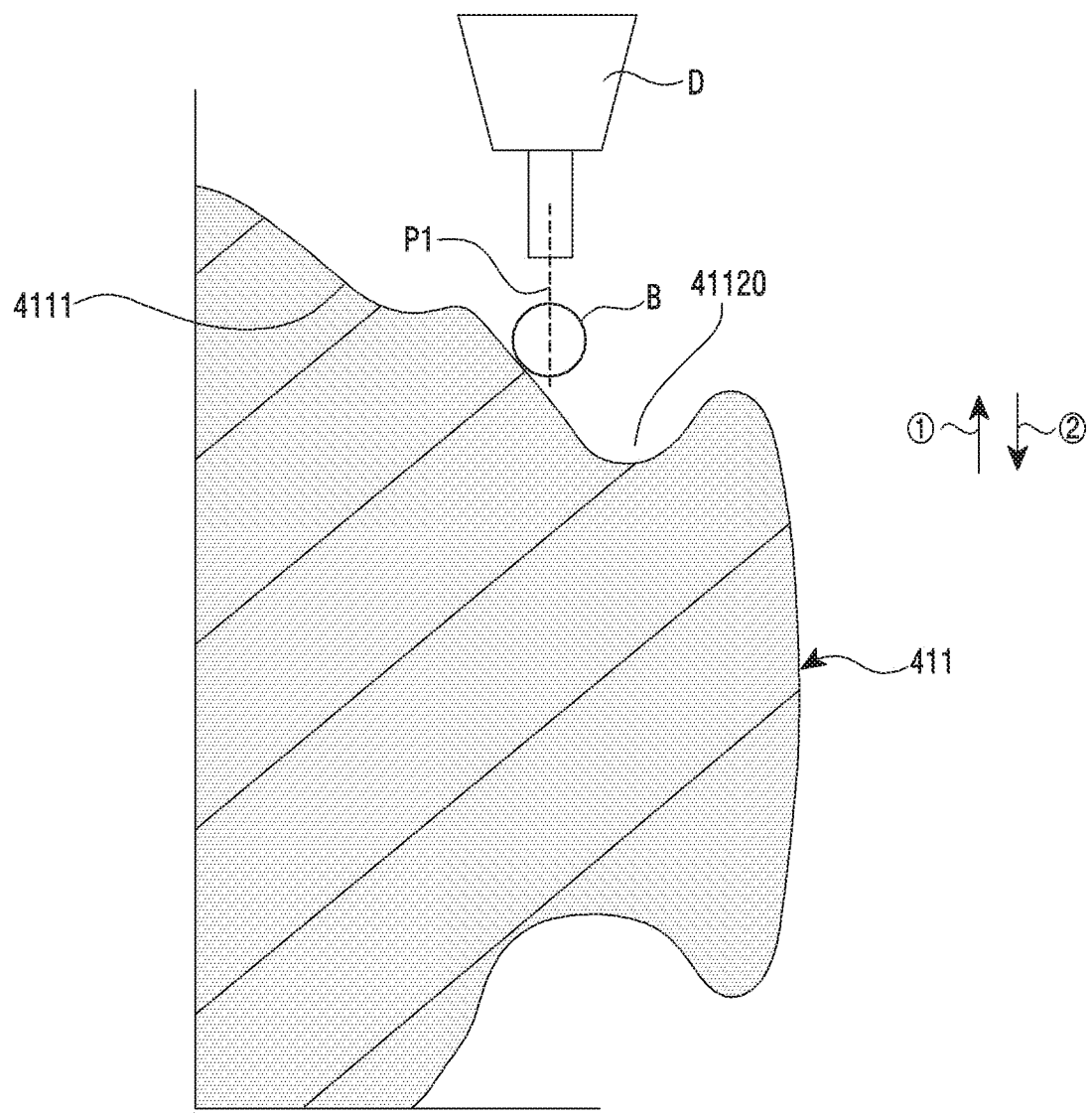
FIG. 6 is a cross-sectional view taken along line A-A' of FIG. 5 according to an embodiment of the disclosure.

FIG. 5 is an enlarged plan view illustrating a portion of a seating part of a housing of an electronic device according to an embodiment of the disclosure. FIG. 6 is a cross-sectional view taken along line A-A' of FIG. 5 according to an embodiment of the disclosure.

Referring to FIGS. 5 and 6, a side member 411 according to an embodiment may include a first surface 4111 facing a curved portion (e.g., the curved portion 4212 illustrated in FIG. 4) of the front plate 421 and facing a first direction (①).

According to an embodiment, the first surface 4111 may include a first groove 41120 recessed in a second direction (②) and accommodating an end of the curved portion (e.g., the curved portion 4212 illustrated in FIG. 4). The first groove 41120 is a portion to which a bonding liquid B supplied from a dispenser D at an application reference position P1, and may be formed to have a valley shape. The bonding liquid B applied to the first groove 41120 and an end of the curved portion (e.g., the curved portion 4212 illustrated in FIG. 4) may be joined to the side member 411 by pressing the applied bonding liquid B. The joining structure may in change of a waterproof function.

According to an embodiment, the first groove 41120 may be manufactured by using a rotary machining tool (not illustrated). The size of a portion trenched by the rotary machining tool may be determined to allow the bonding liquid to stay in the first groove 41120. According to an embodiment, the first groove 41120 may extend along an edge of the side member 411.

According to an embodiment, the first groove 41120 may include an application surface, to which the bonding liquid B is applied. According to an embodiment, the application surface may be a curved surface.

According to an embodiment, the curved surface may be a curved surface that is convex in the second direction (②) when the side member 411 is viewed in a cross-section. According to an embodiment, the curved surface may correspond to curved surfaces that are bent at corner portions of the side member 411 when the side member (e.g., the side member 411 illustrated in FIG. 5) is viewed from the top. According to an embodiment, the curved surface may be a curved surface, according to a change in the height along a periphery of the side member 411 at the corner portions of the side member 411 when the side member (e.g., the side member 411 illustrated in FIG. 4) is viewed from a side.

Figure 7:
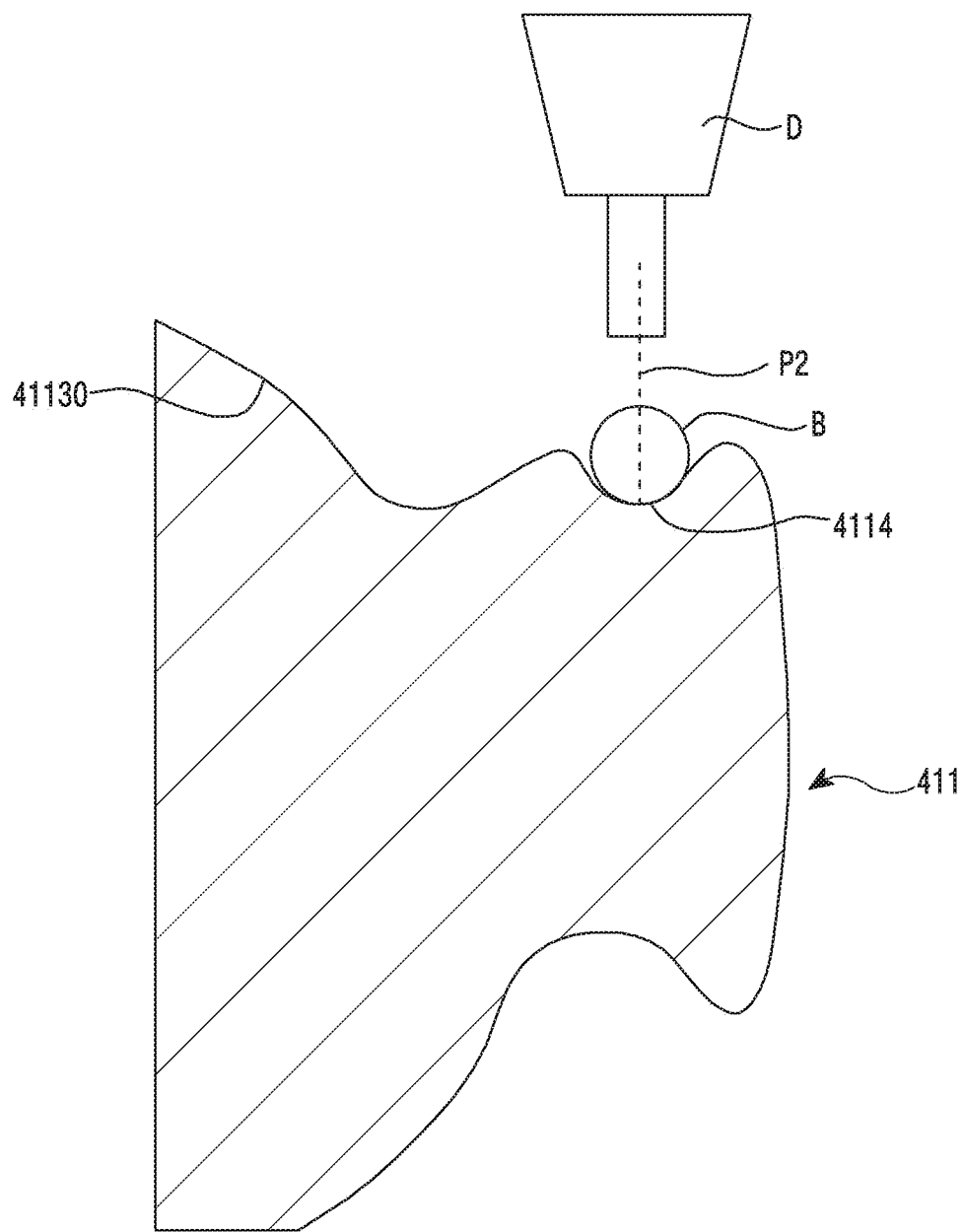
FIG. 7 is a cross-sectional view illustrating a state in which a bonding liquid is applied to a first groove formed in a side member according to an embodiment of the disclosure.

FIG. 7 is a cross-sectional view illustrating a state in which a bonding liquid is applied to a first groove formed in a side member according to an embodiment of the disclosure.

Referring to FIG. 7, a location of a side member 411 (e.g., the side member 411 illustrated in FIG. 4) according to an embodiment, at which a bonding liquid B is seated, is different from that of the side member 411 illustrated in FIG. 6 and the remaining structures thereof is the same as those of the side member 411 illustrated in FIG. 6, and thus a detailed description thereof will be omitted.

According to an embodiment, an application center point P2 of the bonding liquid B is located inside the first groove 4114 formed in a first surface 41130 as compared with the application center point (e.g., the application center point P1 of the bonding liquid illustrated in FIG. 6) and may be located at a site that is closer to an outer surface of the side member 411. According to an embodiment, a seating point of the applied bonding liquid B may be located at a site that is closer to an outer surface of the side member 411 as compared with a seating point of the bonding liquid B illustrated in FIG. 6.

Figure 8:
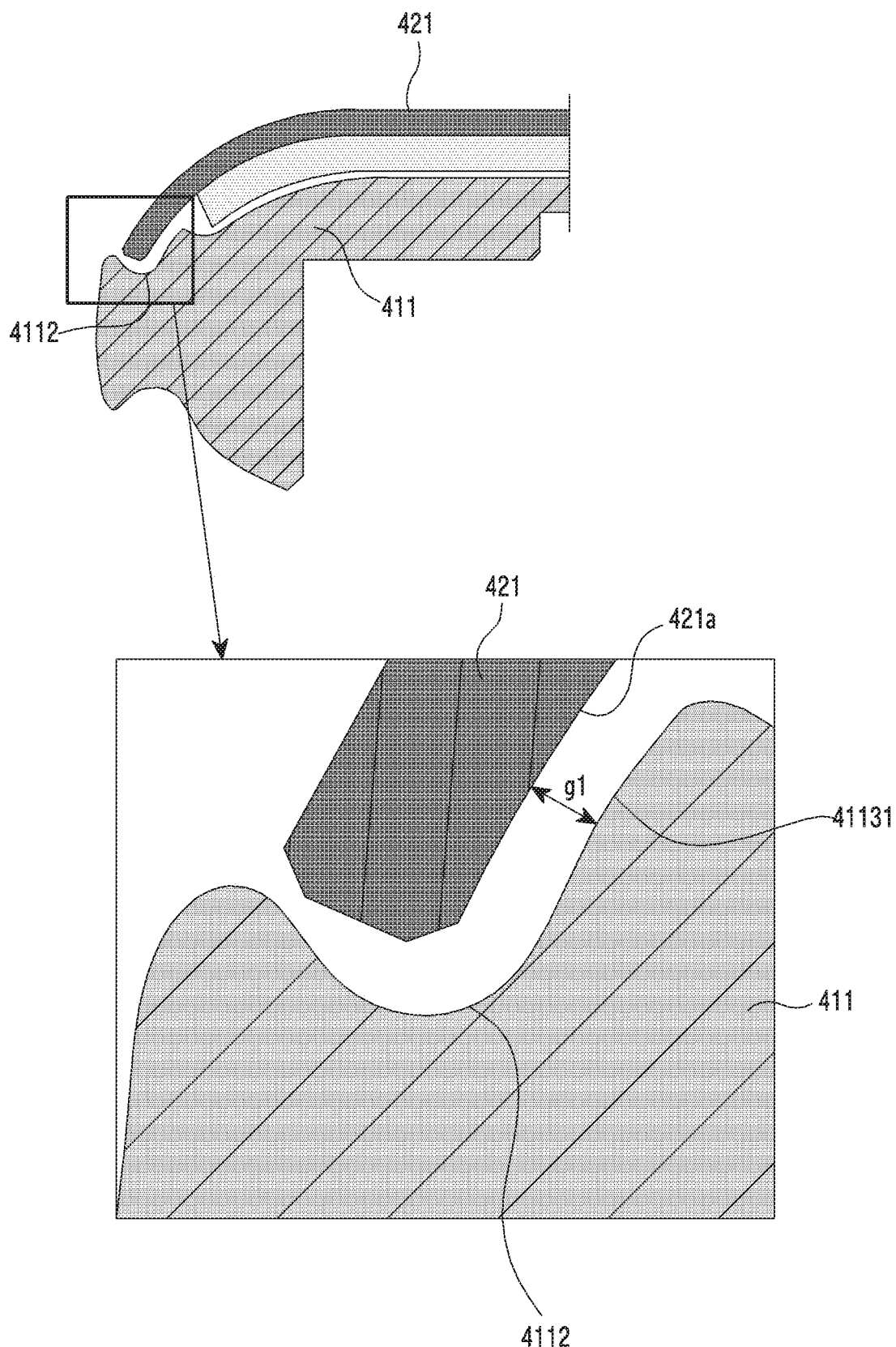
FIG. 8 is a cross-sectional view illustrating a structure in which a constant gap is maintained between a front plate and a side member according to an embodiment of the disclosure.

FIG. 8 is a cross-sectional view illustrating a structure in which a constant gap is maintained between a front plate and a side member according to an embodiment of the disclosure.

Referring to FIG. 8, according to an embodiment, a gap g1 between a first surface 41131 of a side member 411 and an inner surface 421a of an edge of a front plate 421 may be maintained uniformly. A distance between the inner surface 421a of the edge of the front plate 421 and the first surface 41131 may be maintained to one side end of the first groove 4112, which faces an inward direction of the housing.

According to an embodiment, when the applied bonding liquid (e.g., the bonding liquid B illustrated in FIG. 6) is pressed through joining with the front plate 421, the first groove 4112 may be filled with the applied bonding liquid.

Figure 9:
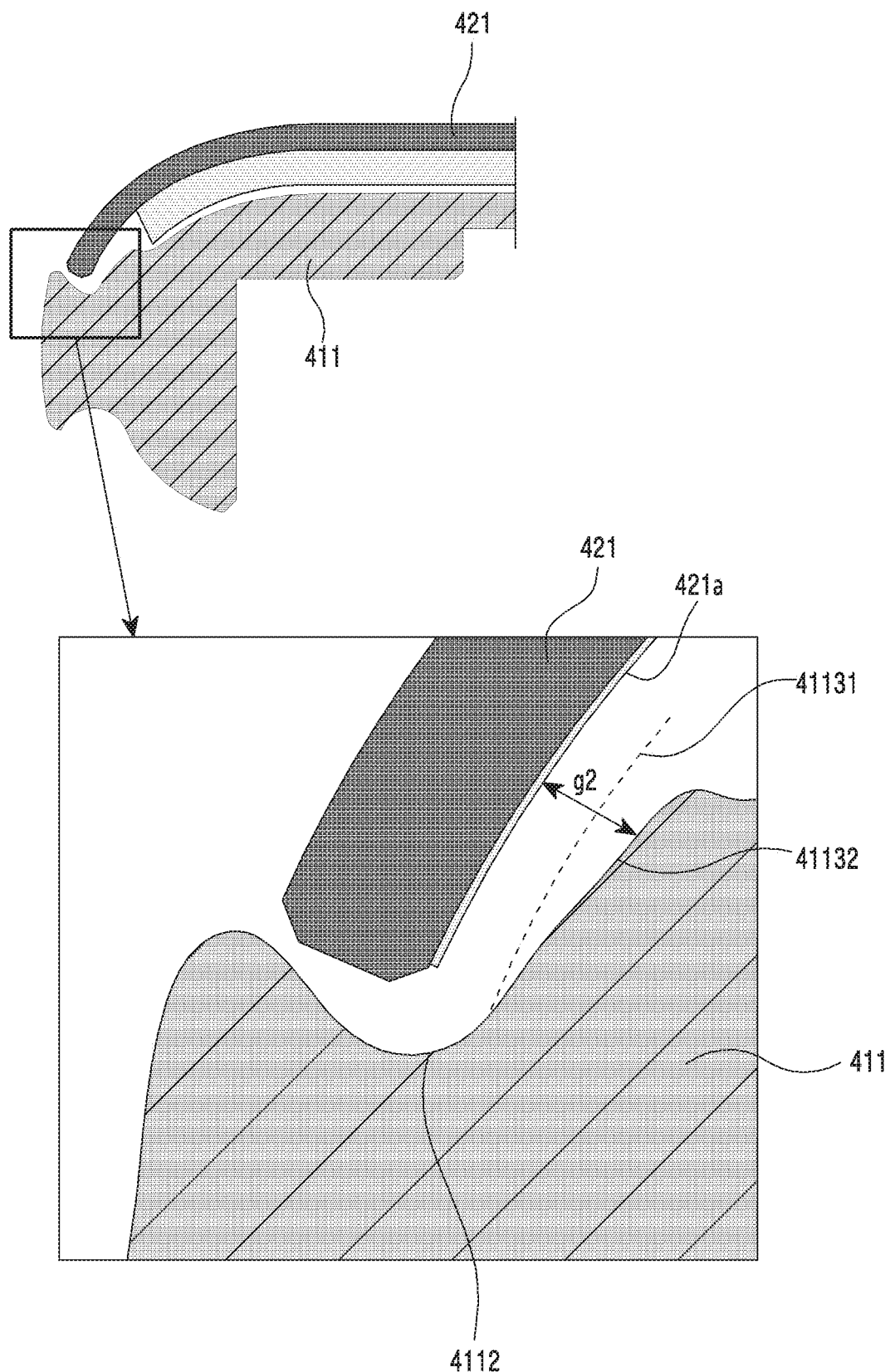
FIG. 9 is a cross-sectional view illustrating a structure in which a gap between a front plate and a side member becomes larger according to an embodiment of the disclosure.

FIG. 9 is a cross-sectional view illustrating a structure in which a gap between a front plate and a side member becomes larger according to an embodiment of the disclosure.

Referring to FIG. 9, according to an embodiment, a gap g2 between a first surface 41132 of a side member 411 and an inner surface 421a of an edge of a front plate 421 may not be maintained uniformly. A distance g2 between the inner surface 421a of the edge of the front plate 421 and the first surface 41132 may become larger as it becomes farther from the bottom of the first groove 4112, that is, it goes toward the inside of the housing 410. According to an embodiment, the first surface 41132 may be formed to be inclined at a degree of approximately −10 degrees as compared with the first surface 41131 illustrated in FIG. 8. Due to the inclination of the first surface 41132, the bonding liquid can be prevented from overflowing to the housing when the display module is seated in the front plate 421.

Figure 10A:
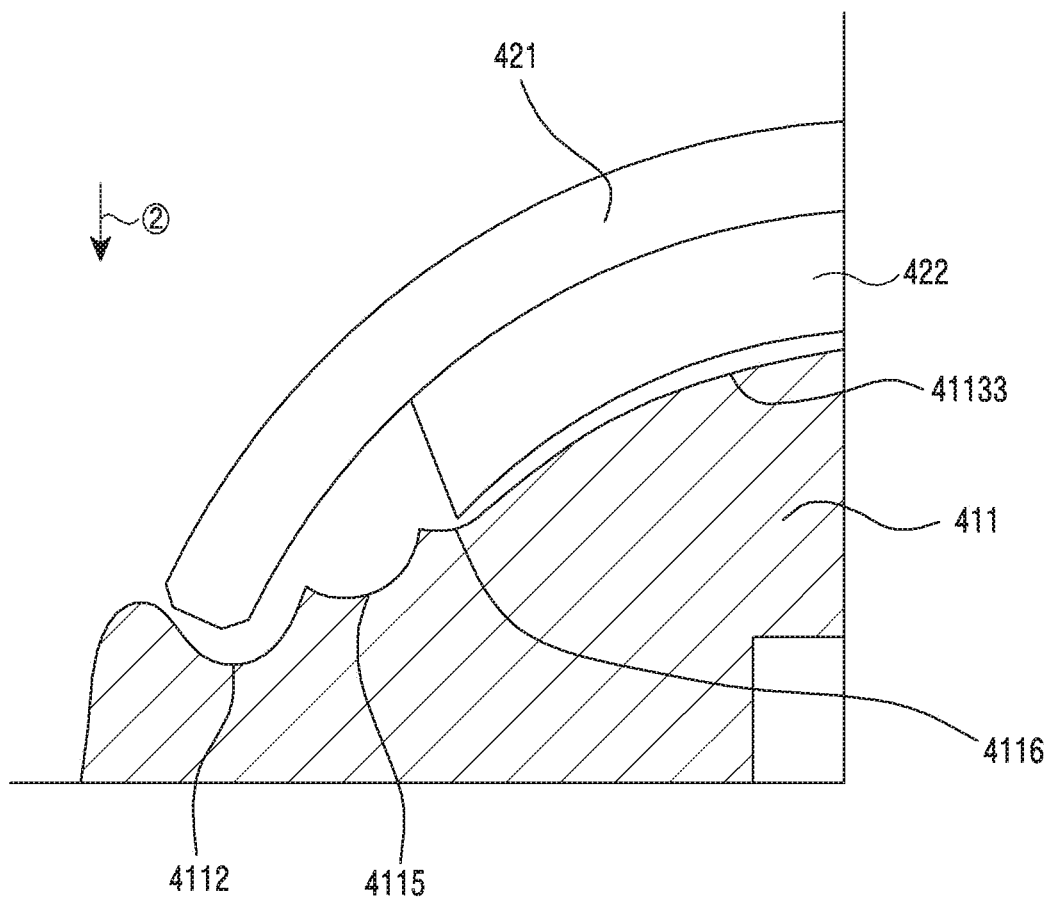
FIG. 10A is a cross-sectional view illustrating a state in which a second groove is formed on a first surface according to an embodiment of the disclosure.
Figure 10B:
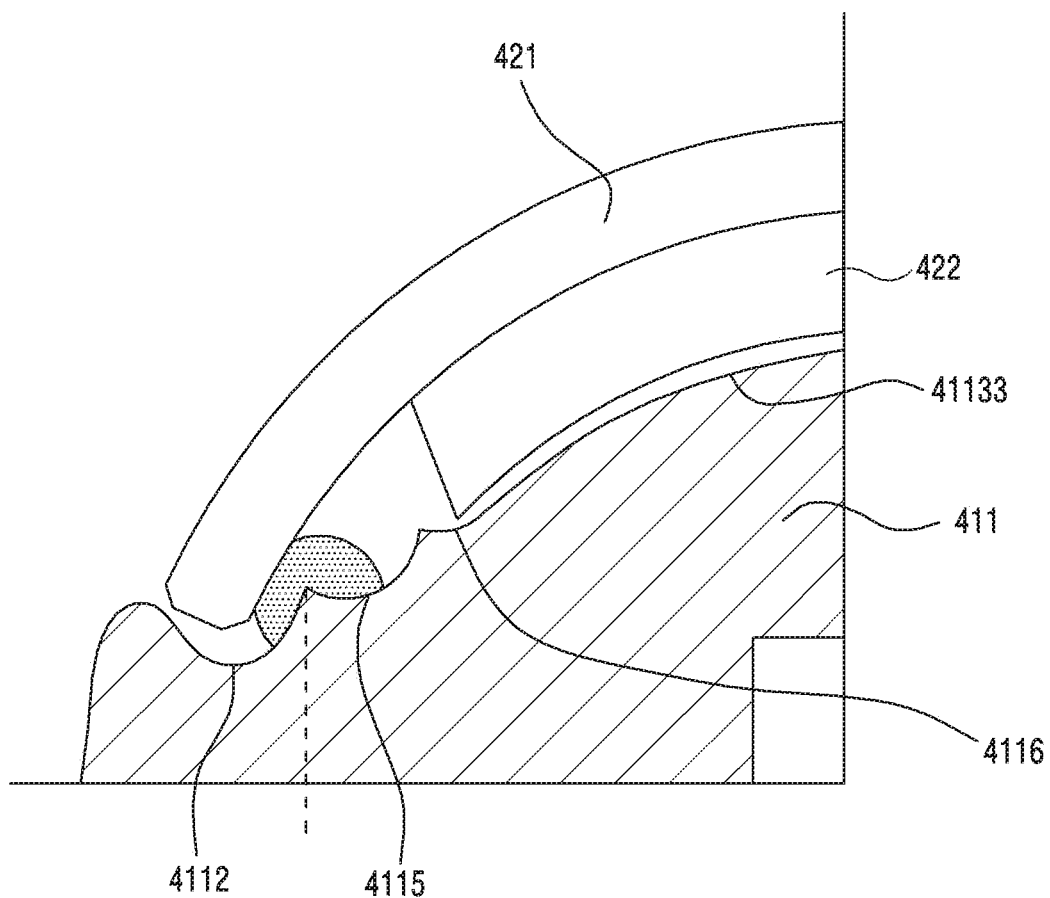
FIG. 10B is a cross-sectional view illustrating a state in which a bonding liquid is applied to a second groove according to an embodiment of the disclosure.

FIG. 10A is a cross-sectional view illustrating a state in which a second groove is formed on a first surface according to an embodiment of the disclosure. FIG. 10B is a cross-sectional view illustrating a state in which a bonding liquid is applied to a second groove according to an embodiment of the disclosure.

Referring to FIGS. 10A and 10B, according to an embodiment, the side member 411 may further include a second groove 4115 on a first surface 41133 to prevent the bonding liquid B from flowing down from an initial application point to another point or from overflowing to the outside of the electronic device. According to an embodiment, the second groove 4115, when viewed from the top of the front plate 421, may be formed on the inner side of a housing (e.g., the housing 410 illustrated in FIG. 4) than the first groove 4112. The second groove 4115 may be a location, at which the bonding liquid B is applied, or may be a point, at which the bolding liquid B gathers. According to an embodiment, the second groove 4115 may have a shape recessed in a second direction (②).

According to an embodiment, the second groove 4115 may extend along an edge of the side member 411 in parallel to the first groove 4112.

According to an embodiment, the first surface 41133 may include a display seating groove 4116, when viewed from the top of the front plate 421, formed in the inward direction of the housing 410 in the second groove 4115. According to an embodiment, the display seating groove 4116 may be a structure for accommodating a display 422.

According to an embodiment, if the display 422 is a thin type, the display seating groove may not be formed on the first surface 41133.

According to an embodiment, the application reference point of the bonding liquid B may be located on the inner side of the housing 410 with respect to a border point of the first and second grooves 4112 and 4115, and may be located on the inner side of the housing 410 with respect to the center of the second groove 4115. According to an embodiment, the second groove 4115 may include an application surface, to which the bonding liquid B is applied. According to an embodiment, the application surface may be a curved surface.

Figure 11:
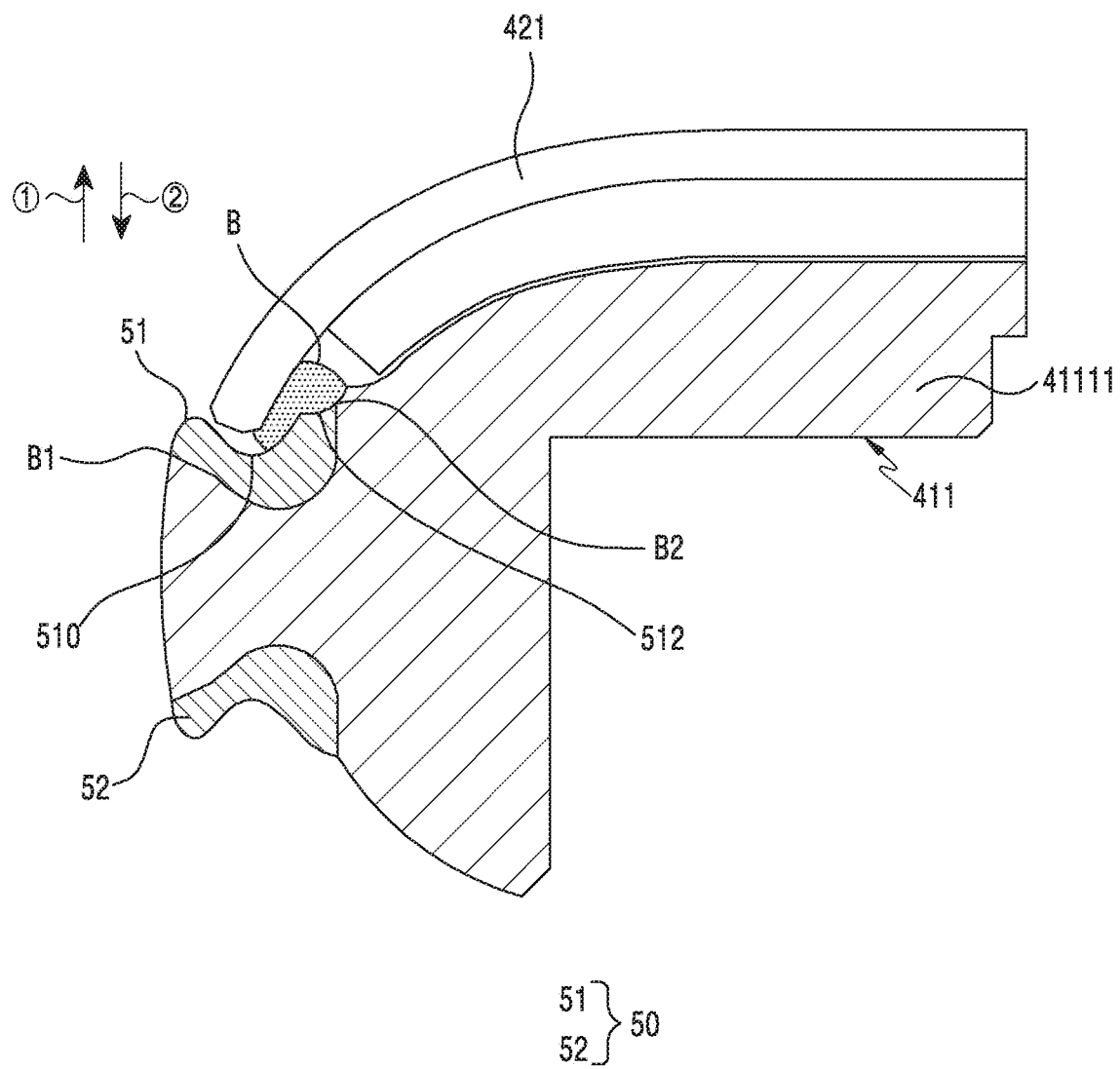
FIG. 11 is a sectional view illustrating a state in which a front plate is joined to a first groove of a side member manufactured through dual injection molding by using dissimilar materials according to an embodiment of the disclosure and is a view illustrating a state in which an interior border surface is sealed by a bonding liquid.

FIG. 11 is a cross-sectional view illustrating a state in which a front plate is joined to a first groove of a side member according to an embodiment of the disclosure and is a view illustrating a state in which an interior border surface is sealed by a bonding liquid.

Referring to FIG. 11, a side member 411 according to an embodiment may include a metallic part 41111 and a nonmetallic part 50. According to an embodiment, the metallic part 41111 and the nonmetallic part 50 may be integrally manufactured through injection molding. According to an embodiment, a portion of the nonmetallic part 50 coupled to the metallic part 41111 may constitute a part of the external appearance of an electronic device. In this structure, the nonmetallic part 50 may be a decorative member. According to an embodiment, at least a portion of the nonmetallic part 50 may be located to be viewed from the outside of the housing.

According to an embodiment, the nonmetallic part 50 may include a first portion 51 disposed to face a first direction (①) from the metallic part 41111, and a second portion 52 disposed to face a second direction (②) from the metallic part 41111. According to an embodiment, the first and second grooves 510 and 512 may be disposed at the first portion 51.

According to an embodiment, the metallic part 41111 and the nonmetallic part 50 are manufactured through injection molding, and at least one border surface, for example, an outer border surface B1 and an inner border surface B2 may be included between the metallic part 41111 and the nonmetallic part 50. Among the border surfaces, the inner border surface B2 located in the interior of the housing 410 may include a waterproof unit or structure.

According to an embodiment, because the bonding liquid B is applied to the second groove 512, in which the inner border surface B2 is disposed, moisture may not be introduced from the outside of the housing (e.g., the housing 410 illustrated in FIG. 4) into the electronic device. If the bonding liquid B applied to the inner border surface B2 is hardened, a waterproof function can be provided. For example, although the moisture that penetrated from the outer border surface B1 may penetrate into the housing through the inner border surface B2, penetration of the moisture into the housing can be prevented because the inner border surface B2 is sealed by the applied bonding liquid B.

Figure 12:
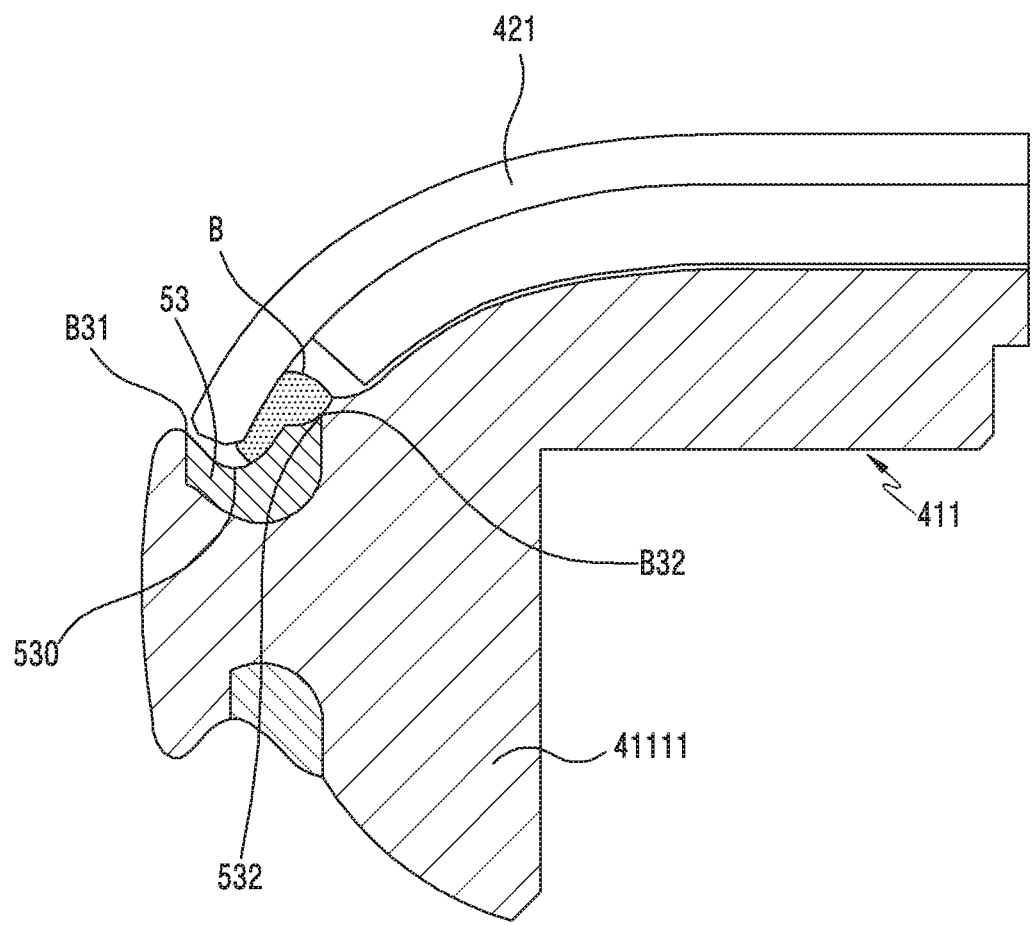
FIG. 12 is a sectional view illustrating a state in which a front plate is joined to a first groove of a side member manufactured through dual injection molding by using dissimilar materials according to an embodiment of the disclosure and is a view illustrating a state in which an interior border surface is sealed by a bonding liquid.

FIG. 12 is a cross-sectional view illustrating a state in which a front plate is joined to a first groove of a side member manufactured through dual injection molding by using dissimilar materials according to an embodiment of the disclosure and is a view illustrating a state in which an interior border surface is sealed by a bonding liquid.

Referring to FIG. 12, according to an embodiment, the locations of the border surfaces between a metallic part 41111 and a nonmetallic part 53 of a side member 411 are different from those of the side member 411 illustrated in FIG. 11. According to an embodiment, a plurality of border surfaces B31 and B32 may be located in the interior of the housing 410. For example, the first border surface B31 may be located outside the housing (e.g., the housing 410 illustrated in FIG. 4) in the first groove 530, and the second border surface B32 may be located in the second groove 532. According to an embodiment, a waterproof structure may be disposed on the second border surface B32 located in the interior of the housing 410.

According to an embodiment, because the bonding liquid B is applied to the second groove 532, the second border surface B32 may be sealed from the outside of the housing. If the bonding liquid B applied to the second border surface B32 is hardened, a waterproof function can be provided. For example, although the moisture that penetrated from the first border surface B31 may penetrate into the housing through the second border surface B32, penetration of the moisture into the housing can be prevented because the second border surface B32 is sealed by the applied bonding liquid B.

Figure 13:
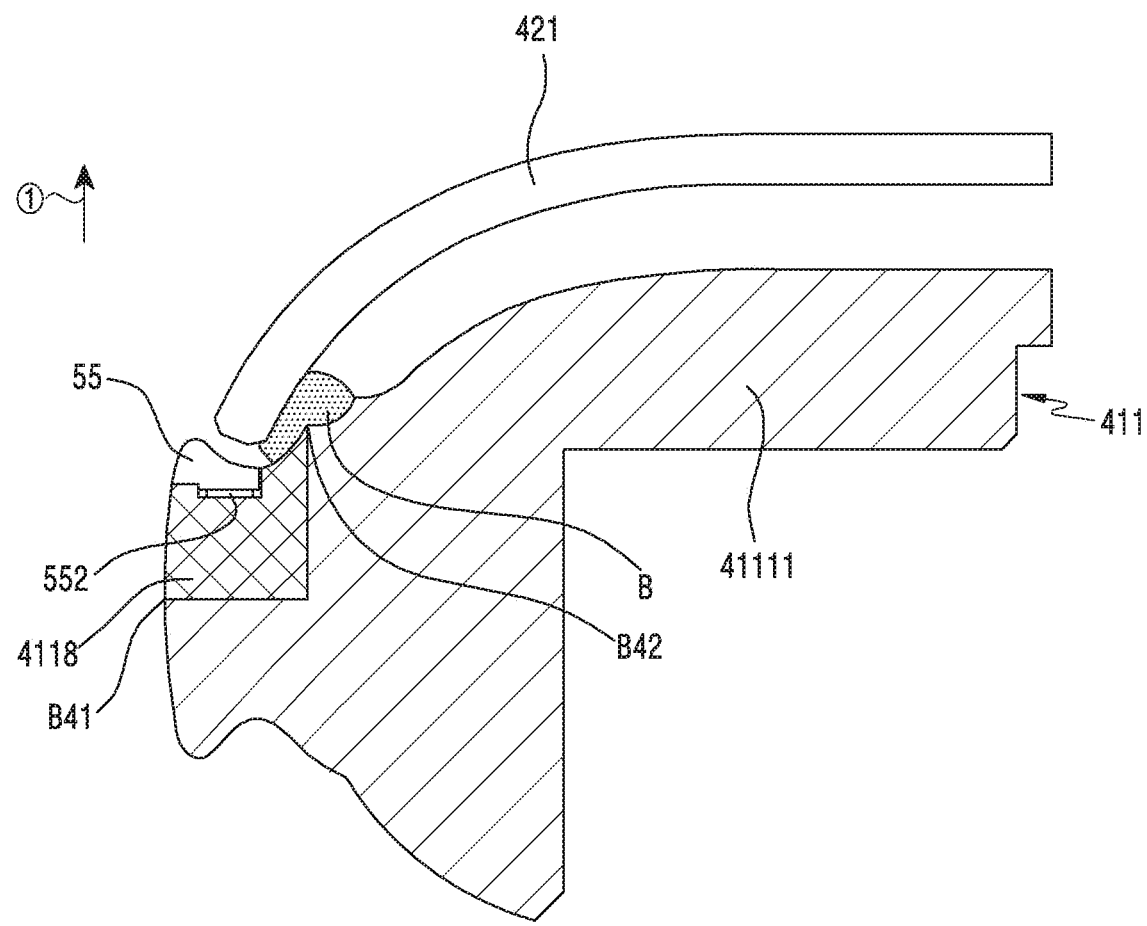
FIG. 13 is a cross-sectional view illustrating a state in which a front plate is joined to a side member, to which a decorative member is attached, according to various embodiments of the disclosure.

FIG. 13 is a cross-sectional view illustrating a state in which a front plate is joined to a side member, to which a decorative member is attached, according to an embodiment of the disclosure.

Referring to FIG. 13, a side member 411 according to an embodiment may include a metallic part 41111 and a decorative member 55. According to an embodiment, the decorative member 55 may be attached by a bonding layer 552 along an edge of the metallic part 41111. For example, the bonding layer 552 may be a double-sided tape. According to an embodiment, the decorative member 55 may be disposed to face a first direction (①) from the metallic part 41111. B may denote the applied bonding liquid.

According to an embodiment, the side member 411 may include a material part 4118 including a material that is different from that of the metallic part 41111. The decorative member 55 may be coupled to the metallic part 41111 in a state in which the decorative member 55 is assembled in the material part 4118 of the side member 411.

According to an embodiment, first and second border surfaces B41 and B42 may be located between the metallic part 41111 and the material part 4118. According to an embodiment, the first border surface B41 may be located outside the housing 410, and the second border surface B42 may be located in the interior of the housing.

According to an embodiment, because the second border surface B42 is sealed from the outside of the housing as the bonding liquid B is applied, introduction of moisture into the housing can be prevented. If the bonding liquid B applied to the second border surface B42 is hardened, a waterproof function can be provided. For example, although the moisture that penetrated from the first border surface B41 may penetrate into the housing through the second border surface B42, penetration of the moisture into the housing can be prevented because the second border surface B42 is sealed by the hardened bonding liquid B.

Figure 14:
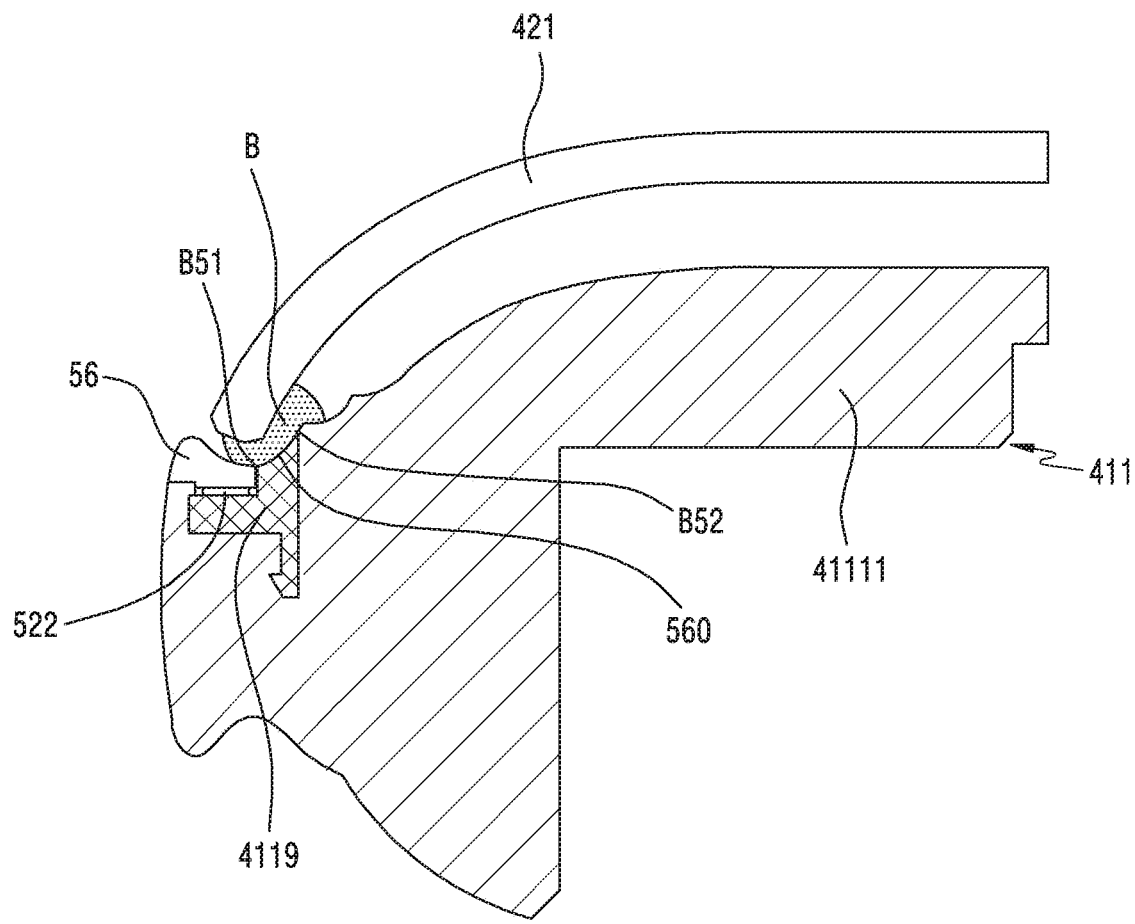
FIG. 14 is a cross-sectional view illustrating a state in which a front plate is joined to a side member, to which a decorative member is attached, according to an embodiment of the disclosure.

FIG. 14 is a cross-sectional view illustrating a state in which a front plate is joined to a side member, to which a decorative member is attached, according to an embodiment of the disclosure.

Referring to FIG. 14, a side member 411 according to an embodiment may include a metallic part 41111 and a decorative member 56. According to an embodiment, the decorative member 56 may be attached by a bonding layer 522 along an edge of the metallic part 41111. For example, the bonding layer 522 may be a double-sided tape. According to an embodiment, one side of the bonding layer 522 may be attached to the decorative member 56, and an opposite surface thereof may be attached to an assembly part 4119.

According to an embodiment, the decorative member 56 may be disposed to face a first direction (①) from the metallic part 41111.

According to an embodiment, the decorative member 56 may be coupled to the side member 411 through a coupling tool, for example, a hook or a screw in a state in which the metallic part and the assembly part 4119 of another material are assembled. According to an embodiment, the material of the assembly part 4119 may be the same as the material of the side member 411. According to an embodiment, the material of the assembly part 4119 may be the same as the material of the decorative member 56. According to an embodiment, a first border surface B51 between the decorative member and the assembly part and a second border surface B52 between the side member 411 and the assembly part 4119 may be sealed by the bonding liquid B applied to the first groove 560 and may function as a waterproof structure.

Figure 15:
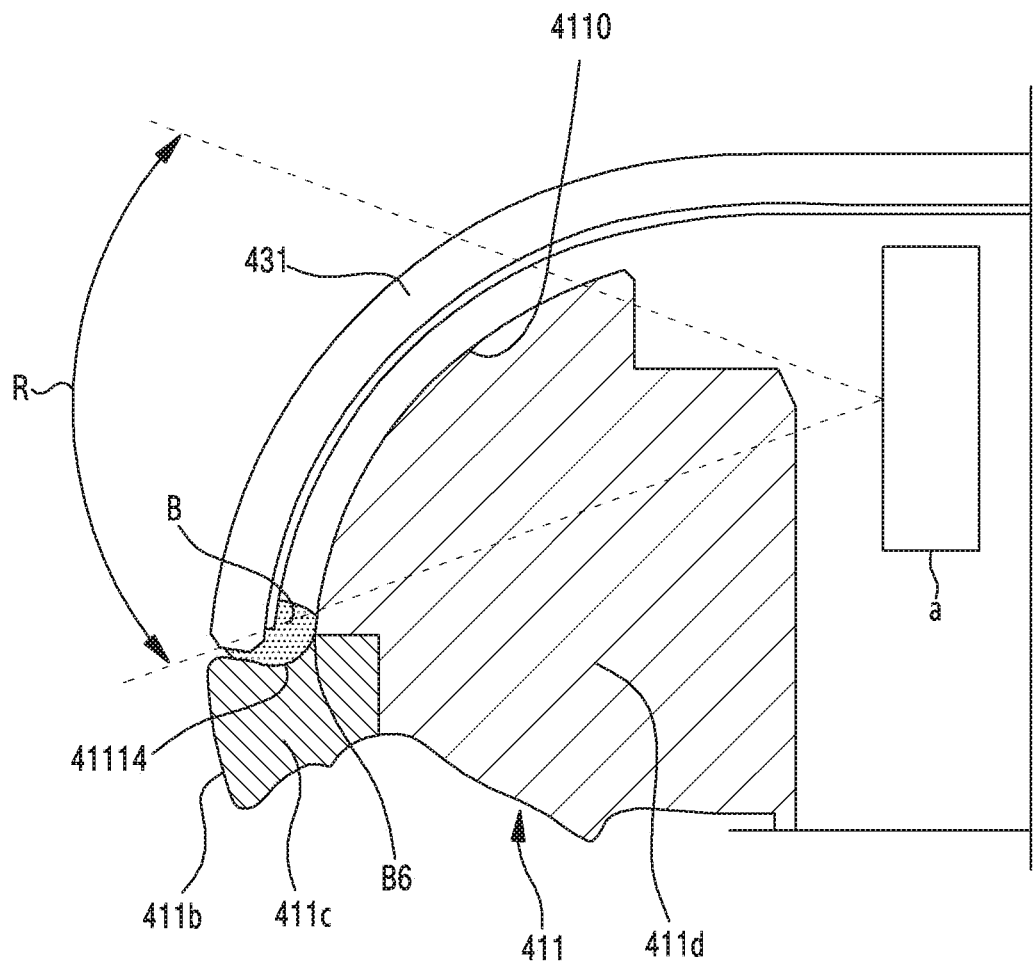
FIG. 15 is a cross-sectional view illustrating a joining state of a rear plate and a side member according to an embodiment of the disclosure.

FIG. 15 is a cross-sectional view illustrating a joining state of a rear plate and a side member according to an embodiment of the disclosure.

Referring to FIG. 15, according to an embodiment, a joining structure may be applied between a rear plate 431 and a side member 411 of an electronic device. According to an embodiment, the side member 411 may include a metallic part 411*c* and a nonmetallic part 411*d* coupled to the metallic part 411c. According to an embodiment, in the structure of the side member 411, the metallic part 411c may disposed outside the housing and the nonmetallic part 411d may be disposed inside the housing.

The joining structure according to an embodiment may include a fourth surface 4110 facing a curved portion of the rear plate 431 and a fourth groove 41114 disposed on the fourth surface 4110. According to an embodiment, the fourth groove 41114 may be a part that accommodates an edge of the curved portion of the rear plate 431 and to which the bonding liquid B is applied. The bonding liquid B may function as a waterproof member that seals a space between the edge of the curved portion of the rear plate 431 and the fourth groove 41114. According to an embodiment, a border surface B6 between the metallic part 411c and the nonmetallic part 411d may be located in the fourth groove 41114, and may be sealed by the bonding liquid B applied to the fourth groove.

According to an embodiment, a fifth generation (5G) mmWave antenna (a) may be disposed at a site that is close to the side member 411. In the 5G mmWave antenna (a), the thickness of the metallic part 411c, in which the exposed surface 411b of the side member 411 is present, may be determined in consideration of a radiating beam distribution range R. According to an embodiment, the metallic part 411c may be disposed in a range other than the radiating beam distribution range R. According to the disposition structure of the metallic part 411c of the side member, an influence on the radiation of the 5G mmWave antenna (a) by the metallic part 411c can be reduced.

According to an embodiment, an electronic device (e.g., the electronic device 400 illustrated in FIG. 1 or the electronic device 400 illustrated in FIG. 4) may include a housing (e.g., the housing 110 illustrated in FIG. 1) including a front plate (e.g., the front plate 421 illustrated I FIG. 4) including a flat portion (e.g., the flat portion 4210 illustrated in FIG. 4) facing a first direction (e.g., the first direction (①) illustrated in FIG. 2), and a curved portion (e.g., the curved portion 4212 illustrated in FIG. 4) bent from a periphery of the flat portion, a rear plate (e.g., the rear plate 111 illustrated in FIG. 2) disposed to face a second direction (e.g., the second direction (②) illustrated in FIG. 2) that is opposite to the first direction, and a side member (e.g., the side member 411 illustrated in FIG. 6) surrounding a space between the front plate and the rear plate, wherein the side member includes a surface (e.g., the surface 4111 illustrated in FIG. 6) extending long to face the curved portion of the front plate, and wherein a first groove (e.g., the first groove 4112 illustrated in FIG. 6) formed to accommodate an end of the curved portion, and a second groove (e.g., the second groove 4115 illustrated in FIG. 5) formed on the inner side of the housing than the first groove, when viewed from the top of the front plate are provided on the surface, and a display (e.g., the display 420 illustrated in FIG. 4) disposed in the space and viewed through the front plate, and a bonding layer (e.g., the bonding layer 415 illustrated in FIG. 4) disposed between the front plate and at least a portion of the first groove.

According to an embodiment, the bonding layer (e.g., the bonding layer 415 illustrated in FIG. 4) may extend along a periphery of the front plate to form a substantially closed curve shape when viewed from the top of the front plate (e.g., the front plate 415 illustrated in FIG. 4).

According to an embodiment, an electronic device (e.g., the electronic device 100 illustrated in FIG. 1 or the electronic device 400 illustrated in FIG. 4) may include a housing (e.g., the housing 110 illustrated in FIG. 1) including a front plate (e.g., the front plate 421 illustrated I FIG. 4) including a flat portion (e.g., the flat portion 4210 illustrated in FIG. 4) and at least one curved portion (e.g., the curved portion 4212 illustrated in FIG. 4) bent from a periphery of the flat portion, and disposed to face a first direction (e.g., the first direction (①) illustrated in FIG. 2), a rear plate (e.g., the rear plate 111 illustrated in FIG. 2) disposed to face a second direction (e.g., the second direction (②) illustrated in FIG. 2) that is opposite to the first direction, and a side member (e.g., the side member 411 illustrated in FIG. 6) including a first surface (e.g., the first surface 4111 illustrated in FIG. 6) disposed to face a direction that is perpendicular to the first and second directions, and extending while facing the curved portion and surrounding at least a partial space between the front plate and the rear plate, a display (e.g., the display 420 illustrated in FIG. 4) disposed to be viewed through at least a portion of the front plate, a first groove (e.g., the first groove 4112 illustrated in FIG. 6) recessed on the first surface in the second direction and in which an end of the curved portion is accommodated, and a bonding layer (e.g., the bonding layer 415 illustrated in FIG. 4) disposed between the front plate and at least a portion of the first groove.

According to an embodiment, the electronic device may further include a second groove (e.g., the second groove 4115 illustrated in FIG. 10) recessed on the inner side of the housing (e.g., the housing 110 illustrated in FIG. 10) than the first groove (e.g., the first groove 4112 illustrated in FIG. 6) when viewed from the top of the front plate (e.g., the front plate 421 illustrated in FIG. 4), recessed in the second direction (e.g., the second direction (②) illustrated in FIG. 2), and in which at least a portion of the bonding layer (e.g., the bonding layer 415 illustrated in FIG. 4) is disposed.

According to an embodiment, a gap (e.g., the gap g1 illustrated in FIG. 8) between the first surface (e.g., the first surface 41131 illustrated in FIG. 4) and an inner surface of an edge of the front plate (e.g., the front plate 421 illustrated in FIG. 4) may be maintained uniformly.

According to an embodiment, a gap (the gap g2 illustrated in FIG. 9) between the first surface (e.g., the first surface 41131 illustrated in FIG. 8) and an inner surface (e.g., the inner surface 421a illustrated in FIG. 8) of an edge of the front plate may become larger as it goes to the inside of the housing.

According to an embodiment, an application point of a bonding liquid (e.g., the bonding liquid B illustrated in FIG. 10) may be located at the center point of the second groove (e.g., the second groove 4115 illustrated in FIG. 10B) or inside the housing (e.g., the housing 110 illustrated in FIG. 1) at the center point of the second groove.

According to an embodiment, the electronic device may further include a display seating recess (e.g., the display seating groove 4116 illustrated in FIG. 10A) formed on the inner side of the housing than the second groove (e.g., the second groove 4115 illustrated in FIG. 10A) when viewed from the top of the front plate (e.g., the front plate 421 illustrated in FIG. 10A), recessed in the second direction (e.g., the second direction (②) illustrated in FIG. 10A), and in which an end of the display is accommodated.

According to an embodiment, the bonding layer (e.g., the bonding layer 415 illustrated in FIG. 4) may continuously extend along a periphery of the front plate when viewed from the top of the front plate (e.g., the front plate 421 illustrated in FIG. 10A), and may be disposed in a substantially closed curve shape.

According to an embodiment, at least a portion of the side member (e.g., the side member 118 illustrated in FIG. 1)

may include a metallic material, and may be disposed in an edge of the housing (e.g., the housing 110 illustrated in FIG. 1) in an segment type to operate as an antenna radiator.

According to an embodiment, the side member (e.g., the side member 411 illustrated in FIG. 12) may include a metallic part (e.g., the metallic part 41111 illustrated in FIG. 12), and a nonmetallic part (e.g., the nonmetallic part 50 illustrated in FIG. 12) formed together with the metallic part through insert molding and including a first portion (e.g., the first portion 51 illustrated in FIG. 12) disposed to face the first direction (e.g., the first direction (①) illustrated in FIG. 12) from the metallic part and a second portion (e.g., the second portion 52 illustrated in FIG. 12) disposed to face the second direction (e.g., the second direction (②) illustrated in FIG. 2) from the metallic part, and the first and second grooves (e.g., the first and second grooves 510 and 512 illustrated in FIG. 12) may be formed at the first portion.

According to an embodiment, a portion of a border surface (e.g., the border surface B2 illustrated in FIG. 12) of the metallic part (e.g., the metallic part 41111 illustrated in FIG. 2) and the nonmetallic part (e.g., then nonmetallic part 50 illustrated in FIG. 12), which is located inside the housing, may be included in the second groove (e.g., the second groove 512 illustrated in FIG. 12).

According to an embodiment, as a bonding liquid (e.g., the bonding liquid B illustrated in FIG. 12) is applied to the second groove (e.g., the second groove 512 illustrated in FIG. 12), a border surface of the metallic part (e.g., the metallic part 41111 illustrated in FIG. 12) and the nonmetallic part (e.g., then nonmetallic part 50 illustrated in FIG. 12) may be sealed to be waterproofed.

According to an embodiment, the side member (e.g., the side member 411 illustrated in FIG. 14) may include a metallic part (e.g., the metallic part 41111 illustrated in FIG. 14), and a decorative member (e.g., the decorative member 55 illustrated in FIG. 14) attached along an edge of the metallic part and disposed to face the first direction (e.g., the first direction (①) illustrated in FIG. 14) from the metallic part.

According to an embodiment, an application surface included in the first groove (e.g., the first groove 4112 illustrated in FIG. 10A) may include a first curved surface.

According to an embodiment, an application surface included in the second groove (e.g., the second groove 4115 illustrated in FIG. 10A) may include a second curved surface.

According to an embodiment, an electronic device (e.g., the electronic device 100 illustrated in FIG. 1 or the electronic device 400 illustrated in FIG. 4) may include a housing (e.g., the housing 110 illustrated in FIG. 1) including a front plate (e.g., the front plate 421 illustrated in FIG. 4) including a flat portion (e.g., the flat portion 4210 illustrated in FIG. 4) and at least one curved portion (e.g., the curved portion 4212 illustrated in FIG. 4) bent from a periphery of the flat portion, and disposed to face a first direction (e.g., the first direction (①) illustrated in FIG. 2), a rear plate (e.g., the rear plate 111 illustrated in FIG. 2) disposed to face a second direction (e.g., the second direction (②) illustrated in FIG. 2) that is opposite to the first direction, and a side member (e.g., the side member 411 illustrated in FIG. 6) including a first surface (e.g., the first surface 4111 illustrated in FIG. 6) disposed to face a direction that is perpendicular to the first and second directions, and extending while facing the curved portion and surrounding at least a partial space between the front plate and the rear plate, a first groove (e.g., the first groove 4112 illustrated in FIG. 10a) recessed on the first surface in the second direction and in which an edge of the curved portion is accommodated, and a second groove (e.g., the second groove 4115 illustrated in FIG. 10a) recessed on the inner side of the housing than the first groove when viewed from the top of the front plate, recessed in the second direction, and to which a bonding liquid is applied.

According to an embodiment, the first groove (e.g., the first groove 4112 illustrated in FIG. 10A) may extend along an edge of the side member (e.g., the side member 411 illustrated in FIG. 10A).

According to an embodiment, the second groove (e.g., the second groove 4115 illustrated in FIG. 10A) may extend along an edge of the side member (e.g., the side member 411 illustrated in FIG. 10A) in parallel to the first groove.

According to an embodiment, the first groove (e.g., the first groove 4112 illustrated in FIG. 10A) and/or the second groove (e.g., the second groove 4115 illustrated in FIG. 10A) may continuously extend along an edge of the front plate when viewed from the top of the front plate, and is disposed in a substantially closed curve shape.

According to an embodiment, a gap between the first surface (e.g., the first surface 41132 illustrated in FIG. 9) and an inner surface (e.g., the inner surface 421a illustrated in FIG. 9) of an edge of the front plate may become larger as it goes to the inside of the housing.

According to an embodiment, an application point of the bonding liquid (e.g., the bonding liquid B illustrated in FIG. 10B) may be located at the center point of the second grove or inside the housing (e.g., the housing 110 illustrated in FIG. 1) at the center point of the second groove.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
   a housing comprising:
      a front plate comprising a flat portion and at least one curved portion bent from a periphery of the flat portion, the front plate facing a first direction,
      a rear plate facing a second direction opposite to the first direction, and
      a side member comprising a first surface facing a direction perpendicular to the first and second directions, the side member extending while facing the curved portion and surrounding at least a partial space between the front plate and the rear plate;
   a display viewable through at least a portion of the front plate;
   a first groove in the side member and recessed in the second direction, an end of the curved portion being accommodated in the first groove, the first groove comprising a first surface portion extending in the first direction toward the side member and a second surface portion extending in the first direction toward an inside of the housing, the first surface portion extending to a first height, the second surface portion extending to a second height greater than the first height; and
   a bonding layer disposed between the front plate and at least a portion of the first groove.
2. The electronic device of claim 1, further comprising:
   a second groove recessed on an inner side of the housing when viewed from a top of the front plate, wherein the second groove is recessed in the second direction, at least a portion of the bonding layer being disposed in the second groove.

3. The electronic device of claim 1, wherein a gap between the first surface and an inner surface of an edge of the front plate is maintained uniformly.

4. The electronic device of claim 1, wherein a gap between the first surface and an inner surface of an edge of the front plate becomes larger as the gap extends to the inside of the housing.

5. The electronic device of claim 2, wherein an application point of a bonding liquid is at least one of located at a center point of the second groove or eccentrically located toward the inside of the housing from the center point of the second groove.

6. The electronic device of claim 2, further comprising:
a display seating recess formed on the inner side of the housing when viewed from the top of the front plate,
wherein the display seating recess is recessed in the second direction, and
wherein an end of the display is accommodated in the display seating recess.

7. The electronic device of claim 2, wherein the bonding layer continuously extends along a periphery of the front plate when viewed from the top of the front plate, and is disposed in a substantially closed curve shape.

8. The electronic device of claim 1, wherein at least a portion of the side member comprises a metallic material, and is disposed in an edge of the housing in a segment type to operate as an antenna radiator.

9. The electronic device of claim 2,
wherein the side member comprises:
a metallic part, and
a nonmetallic part formed together with the metallic part through insert molding,
wherein the nonmetallic part comprises:
a first portion facing the first direction from the metallic part, and
a second portion facing the second direction from the metallic part, and
wherein the first and second grooves are formed at the first portion.

10. The electronic device of claim 9, wherein a portion of a border surface of the metallic part and the nonmetallic part, which is located inside the housing, is included in the second groove.

11. The electronic device of claim 9, wherein as a bonding liquid is applied to the second groove, a border surface of the metallic part and the nonmetallic part is sealed to be waterproofed.

12. The electronic device of claim 2, wherein the side member comprises:
a metallic part; and
a decorative member attached along an edge of the metallic part facing the first direction from the metallic part.

13. The electronic device of claim 1, wherein an application surface included in the first groove comprises a first curved surface.

14. The electronic device of claim 2, wherein an application surface included in the second groove comprises a second curved surface.

15. An electronic device comprising:
a housing comprising:
a front plate comprising a flat portion and at least one curved portion bent from a periphery of the flat portion, the front plate facing a first direction,
a rear plate facing a second direction opposite to the first direction, and
a side member comprising a first surface facing a direction perpendicular to the first and second directions, the side member extending while facing the curved portion and surrounding at least a partial space between the front plate and the rear plate;
a first groove in the side member and recessed in the second direction, an edge of the curved portion is-being accommodated in the first groove, the first groove comprising a first surface portion extending in the first direction toward the side member and a second surface portion extending in the first direction toward an inside of the housing, the first surface portion extending to a first height, the second surface portion extending to a second height greater than the first height; and
a second groove in the side member and recessed in the second direction, a bonding liquid being applied to the second groove, the second groove comprising at least one surface extending in the first direction to a third height greater than the second height of the second surface portion of the first groove.

16. The electronic device of claim 15, wherein the first groove extends along an edge of the side member.

17. The electronic device of claim 15, wherein the second groove extends along an edge of the side member in parallel to the first groove.

18. The electronic device of claim 15, wherein at least one of the first groove or the second groove continuously extends along an edge of the front plate when viewed from a top of the front plate, and is disposed in a substantially closed curve shape.

19. The electronic device of claim 15, further comprising:
a gap between the first surface and an inner surface of an edge of the front plate, the gap becoming larger as the gap extends to the inside of the housing.

20. The electronic device of claim 15, wherein an application point of the bonding liquid is at least one of located at a center point of the second groove or eccentrically located toward an inside of the housing from the center point of the second groove.

* * * * *